US012782164B2

(12) United States Patent
Burnand et al.

(10) Patent No.: US 12,782,164 B2
(45) Date of Patent: Nov. 3, 2026

(54) METHOD OF DETERMINING THE AXIAL DISPLACEMENT OR AXIAL POSITION OF A SHAFT OF AN ELECTRONIC CONTROL DEVICE

(71) Applicant: ETA SA MANUFACTURE HORLOGÉRE SUISSE, Grenchen (CH)

(72) Inventors: Guillaume Burnand, Yverdon-les-Bains (CH); Marine Fumeaux, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 163 days.

(21) Appl. No.: 18/944,740

(22) Filed: Nov. 12, 2024

(65) Prior Publication Data

US 2025/0244148 A1 Jul. 31, 2025

(30) Foreign Application Priority Data

Jan. 26, 2024 (EP) .................................... 24154198

(51) Int. Cl.
*G01D 5/14* (2006.01)
*G01B 7/30* (2006.01)
*G04G 21/08* (2010.01)

(52) U.S. Cl.
CPC ............... *G01D 5/145* (2013.01); *G01B 7/30* (2013.01); *G04G 21/08* (2013.01)

(58) Field of Classification Search
CPC ............ G01D 5/14; G01D 5/145; G01D 3/02; G01D 2205/18; G01B 7/30; G01B 7/00;
(Continued)

(56) References Cited

U.S. PATENT DOCUMENTS

2018/0052208 A1* 2/2018 Onaka .................... G01D 5/145
2021/0293579 A1* 9/2021 Xie ........................ G01D 5/249

FOREIGN PATENT DOCUMENTS

CN 106405658 A * 2/2017 ............. G01V 3/081
CN 106569150 A * 4/2017 ......... G01R 33/0035
(Continued)

OTHER PUBLICATIONS

European Search Report for 24 15 4198 dated Jun. 11, 2024.

*Primary Examiner* — Son T Le
(74) *Attorney, Agent, or Firm* — Sughrue Mion, PLLC

(57) ABSTRACT

A method of determining the axial displacement or axial position of a magnetised shaft, such as a setting stem (3) of a timepiece, of an electronic control device (1). The method includes obtaining a new function by multiplying the norm of the magnetic field generated by the magnetised shaft by a selected compensation function, which depends only on the rotation angle of the shaft in a plane orthogonal to the rotation axis of the shaft. This allows to simplify the processing of measurement and to strongly minimise the necessary memory resources as there is no need to store a high number of different curves corresponding to different angular positions. By applying the proposed method using said new function, it is possible to detect in a sufficiently precise manner axial displacements/positions of the shaft, by using preferably a single magnetic sensor.

13 Claims, 7 Drawing Sheets

(58) Field of Classification Search
CPC . G01B 7/003; G01B 7/02; G04C 3/00; G04C 3/004; G04G 21/08
See application file for complete search history.

(56) References Cited

FOREIGN PATENT DOCUMENTS

| | | | | | |
|---|---|---|---|---|---|
| CN | 107515001 | B | * | 11/2019 | ........... G01C 21/165 |
| EP | 3 210 083 | B1 | | 4/2020 | |
| EP | 3 875 915 | A1 | | 9/2021 | |

* cited by examiner

METHOD OF DETERMINING THE AXIAL DISPLACEMENT OR AXIAL POSITION OF A SHAFT OF AN ELECTRONIC CONTROL DEVICE

CROSS REFERENCE TO RELATED APPLICATIONS

This application claims priority to European Patent Application No. 24154198.6 filed Jan. 26, 2024, the entire contents of which are incorporated herein by reference.

TECHNICAL FIELD

The present invention relates to a method of determining the axial displacement or axial position of a shaft of an electronic control device. The shaft may for instance be a setting stem of a timepiece. The present invention focuses on magnetic crown stem associated with an electronic control module comprising a magnetometer, where the magnetic field of a magnet attached to the stem is measured in order to determine the axial position/displacement of the stem. The invention also relates to an apparatus configured to carry out the method.

BACKGROUND OF THE INVENTION

In a first type of electronic crown stem, the axial position of the stem is usually determined by electrical contacts which close or open at stable mechanical positions of the stem called T1, T2 and T3, where T1 refers to a rest position, T2 refers to a date setting position, and T3 refers to a time setting position. If the electronic control device also allows the stem to operate as a press button, a further position is TO is defined, which refers to a position where the crown is pressed, and the stem is in contact with an end electrical contact. These electrical contacts are mechanically actuated by many parts of relatively high complexity in contact with the stem.

In a particular electronic control device equipped with a magnet for detecting a rotation of the crown stem, the magnet forms a sliding part in order to maintain its axial position when the stem moves. The sliding part has a central hole with a square profile and the stem comprises at least a portion, with a corresponding square section, which passes in the square hole, so that the magnet is driven in rotation by the stem. The main shortcoming of the above-described solution is that as many electrical contacts as stable positions of the stem are needed. Electrical contacts must not undergo oxidation over time and must resist shocks. Furthermore, the number of mechanical parts is high, and their assembly is relatively complex and expensive.

In a second type of electronic crown stem with a magnetic system, the magnet is attached to the stem and moves axially and rotationally with the stem. Rotation detection of the stem is implemented in position T1 using a magnetometer. Pressing the crown activates an end switch (position T0). The crown stem is thus used as a pusher and when the switch is pressed, it can be determined that the crown stem is in position T0. It often happens that when the crown is pressed to activate the switch, the stem is involuntarily rotated while the rotation of the stem is still detected by the magnetometer. This involuntary rotation can be interpreted by the watch as an action to be undertaken (changing a selected item of a displayed menu for example) before pressing the switch (validation to enter a selected item).

European patent EP 3210083 B1 concerns a method for detecting the angular position of a magnet fixedly mounted on a control stem, this magnet being magnetised diametrically. The detection of the axial position of the magnet is only very briefly mentioned and not explained. The method proposed in EP 3210083 B1 is based on the measurements of the three magnetic field components of a magnetic field generated by the magnet, the magnetic field vector describing ellipses, as shown in FIG. 1, for different axial positions and a complete rotation of the magnet. When these ellipses are projected onto a two-dimensional (2D) plane (X-Y), the resulting 2D curves remains elliptical, as shown in FIG. 2. In order to accurately determine the angular position of the control stem, it is needed to have instead a circular curve in the X-Y plane. For this purpose, the magnetic field vector is projected onto the two-dimensional (2D) plane X-Y by using a given transformation matrix. However, as can be seen on FIG. 3, for a preselected transformation matrix, the projection describes a circle only for a given axial position of the magnet/stem. The projections for other axal positions describe ellipses. It is not mentioned in EP 3210083 B1, but we can assume that the radius of the two circles shown in FIG. 3 of this patent document which is used for the detection of the axial displacement/position (the radius decreases as the rod and therefore the magnet move away from the magnetic sensor/magnetometer). However, as mentioned, we observe that a circle is obtained only for a given axial position with a preselected transformation matrix. Thus, for all other axial positions, there is firstly an imprecision on the detection of the rotation angle value of the stem and secondly the length of the projected measured magnetic field vector cannot provide a precise axial position because it depends also on the rotation angle, such a vector describing an ellipse by varying the rotation angle over 360°. Consequently, as long as the axial position of the stem is not known, it is not possible to correctly determine the axial position of the stem and moreover it is not possible to precisely determine an angular position of this stem. Thus, the method for determining the axial position suggested in document EP3210083B1 is first unclear and without detailed explanations. Further, the teaching of this patent document leaves the skilled person without means to measure efficiently and precisely the axial position of a magnet, in particular a bipolar magnet, and thus of the stem.

SUMMARY OF THE INVENTION

An object of the present invention is to overcome at least some of the above shortcomings of the existing solutions of magnetised control rods or shafts. An object of the present invention is thus to provide a solution for determining the axial displacement or axial position of a shaft of an electronic control device, such as a crown stem arrangement of a watch.

According to a first aspect of the invention, there is provided a method of determining an axial displacement or axial position of a shaft of an electronic control device or a control value, for a given function or operation, depending on the axial displacement or axial position of the shaft as recited in claim 1.

The present invention has the advantage that it makes possible to detect the axial displacement or axial position of the crown stem (when the invention is applied to watches) with a relatively high level of certainty and without using electrical contacts and corresponding mechanical parts.

In a particular mode, the present invention allows the detection of the axial displacement or axial position of the shaft to be used to prevent the detection of shaft rotation or disregard it, to avoid taking an involuntary action relating to the rotation of the shaft, or to adjust an intensity for a function of the electronic watch.

The software implementation in a microcontroller or digital signal processor to determine the axial displacement or axial position of the stem is relatively simple. Furthermore, the majority of magnetometers have three measurement axes, which therefore makes it possible to use these magnetometers for the determination of the axial displacement according to the present invention without generating additional costs by adding a sensor solely dedicated to measuring axial displacement.

According to a second aspect of the invention, there is provided an electronic control module for determining the axial displacement or axial position of a shaft of an electronic control device as recited in claim 12. According to a third aspect of the invention, there is provided a timepiece comprising the electronic control module. Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
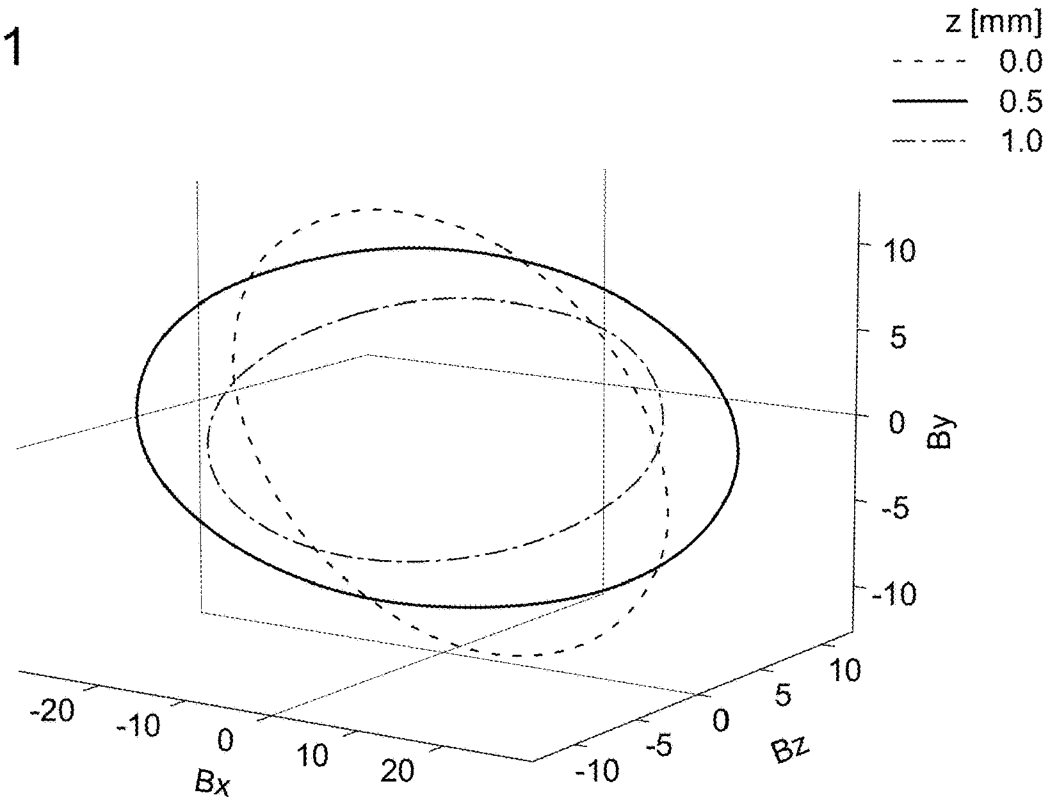
FIG. 1, already described, shows measurements of 3D components of a magnetic field as a function of the angle of rotation of a bipolar magnet, which has a diametral magnetization axis (the two magnetic poles being diametrically opposed), and an axial position of this magnet according to EP 3210083 B1.
Figure 2:
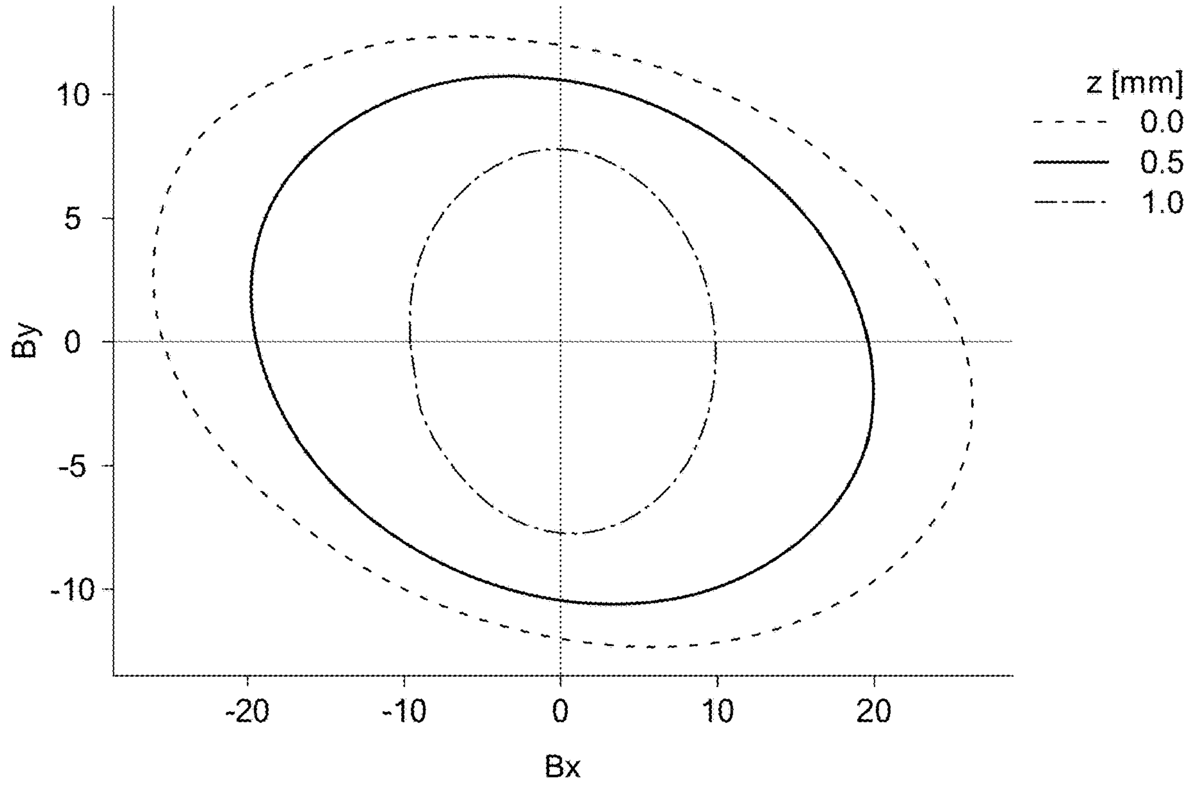
FIG. 2, already described, shows measurements of 2D components of the magnetic field as a function of the angle of rotation of the bipolar magnet and the axial position of this magnet according to EP 3210083 B1.
Figure 3:
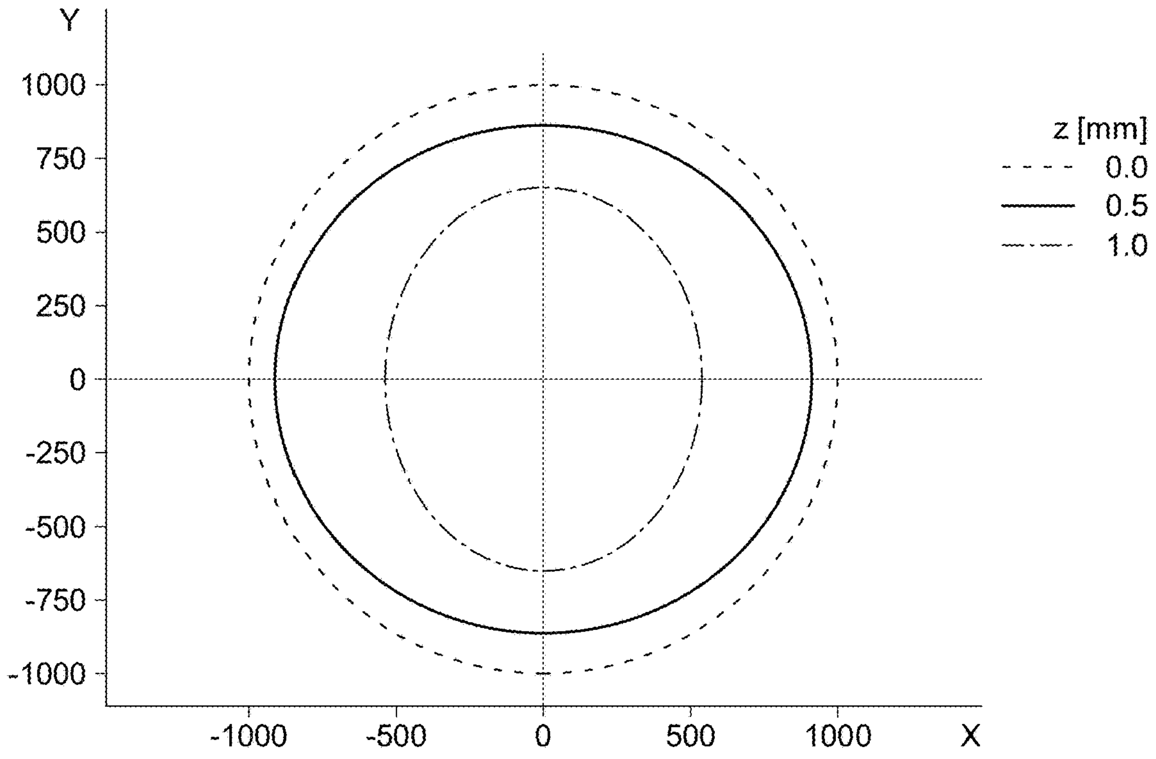
FIG. 3, already described, shows 2D components of the magnetic field projected onto the X-Y plane, by using a transformation matrix in order to have in this plane a circle for z=0.0, as a function of the angle of rotation of the bipolar magnet and the axial position of this magnet according to EP 3210083 B1.

An embodiment of the present invention will next be described in detail with reference to the attached figures. The invention will be described in the context of an axial displacement or axial position detection of a shaft of an electronic control device of a timepiece, where the shaft in the present example is a setting stem, associated with an external crown, of the electronic control device. The electronic control device as described below comprises at least a crown, a setting stem, a magnetic element mounted integrally on the stem, and an electronic control module formed by a magnetometer and a signal processor. In this configuration, a magnetic field is generated by the magnetic element of the rotating stem. However, the teachings of the invention are not limited to this environment or application.

Identical or corresponding functional and structural elements, which appear in different drawings, are assigned with the same reference numerals. As utilised herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend".

In the present description, a magnetic field is a vector field that describes the magnetic influence of electrical currents and magnetised materials. The term "magnetic field" is sometimes used for two distinct, but closely related fields denoted by symbols B and H. H is measured in units of amperes per meter while B is measured in teslas, which are equivalent to newtons per meter per ampere. H and B differ in how they account for magnetisation. In a vacuum, B and H are the same apart from units, but in a magnetised material, they differ by the magnetisation M of the material. In the following description, the magnetic field is expressed as B but H could be used interchangeably.

Figure 4:
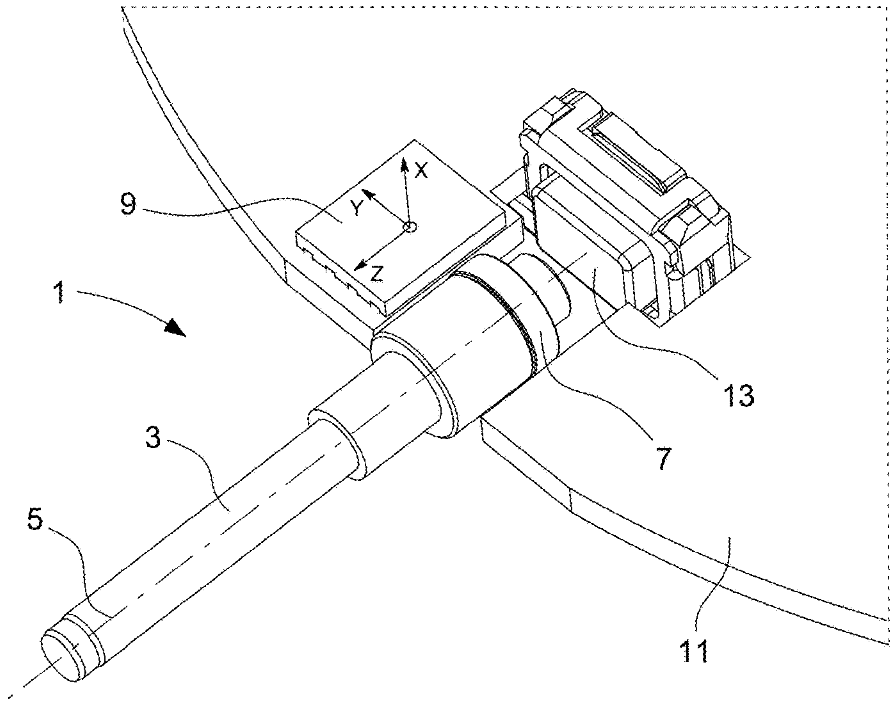
FIG. 4 illustrates, in an isometric view, an example of an electronic control device according to the present invention.

FIG. 4 shows an example of an electronic control device 1 where the teachings of the present invention may be applied. There is shown a rotatable element or shaft 3, which in this example is a setting stem of a timepiece, such as a wristwatch. The stem 3 defines a rotation axis 5, which coincides with a central or longitudinal axis of the stem 3. Such a setting stem is also known as a crown stem. Thus, the rotatable element 3 (i.e., the stem) of this example would be a small elongate piece, with a diameter in the range of 0.5 mm to 1 mm, for example. The stem 3 is provided with a magnet 7, assembled with the stem so that it is integral in rotation and axial displacement with this stem, at its internal end region (i.e., in the case of the setting stem being terminated by a crown, at the end of the setting stem opposite to the crown and located in the timepiece case). The magnet is in this example configured as a ring in which the stem passes through. The magnet 7 is preferably a bipolar permanent magnet with diametral magnetization, the two magnetic poles being diametrically opposed relatively to the rotation axis 5, named hereafter 'bipolar magnet' or simply 'magnet'.

The stem 3 and thus the magnet 7 have only two degrees of freedom, one in rotation with respect to the rotation axis 5, and the other one in translation along this rotation axis 5. The angle of rotation of the magnet and thus of the stem is denoted by θ and the axial displacement/position of the magnet and thus of the stem is denoted by z along the rotation axis.

A magnetometer 9, mounted on a circuit board 11 in particular a printed circuit board (PCB), measures the magnetic induction fields of the magnet along the three orthogonal axes X, Y and Z, forming a reference frame of this magnetometer, respectively $B_x$, $B_y$ and $B_z$. The Z axis is parallel to the rotation axis 5 of the stem and thus of the magnet, so that the plane X-Y is perpendicular to the rotation axis 5. In the present example, the centre of the magnetometer, located at the origin of the reference frame, defines a zero position (z=0) for the bipolar magnet 7 and thus for the stem along the rotation axis; that is, the crossing of the X-Y plane by the rotation axis 5 defines the axial position zero (z=0) for the magnet and thus for the stem 3. An optional switch 13 is also provided, which in this example is used to selectively enable and disable the magnetometer and/or to activate a selected function of the timepiece.

Magnetic field lines generated by the magnet 7 impinge on the magnetometer 9, which is a three-axis sensor device measuring the incident magnetic field along three measurement axes, namely the X, Y and Z axes. The magnetometer 9 may for example be a miniature surface-mount device (SMD) fitted to the PCB 11 and connected to the PCB via SMD connections.

In this example, the magnetometer 9 is a Hall effect sensor device, which is a device used to measure the magnitude or intensity of a magnetic field. The output voltage of a Hall sensor is directly proportional to the magnetic field strength through it. The magnetometer 9 is arranged to determine the intensity of a first magnetic field component $B_x$ along a first axis, which in this case is the X axis, the intensity of a second magnetic field component $B_y$ along a second axis, which in this case is the Y axis, and the intensity of a third magnetic field component $B_z$ along a third axis, which in this case is the Z axis. In this example, these three axes are orthogonal to each other. A temperature sensor (not shown in the figures) may additionally be provided in order to measure the temperature. The temperature sensor if provided may for instance be integrated in the magnetometer 9. The behaviour of the Hall sensors typically depends on the temperature at which they operate. It is to be noted that instead of the system comprising one three-axis magnetometer, it may for example comprise three independent magnetic field sensors, each configured to measure different one of the magnetic field components $B_x$, $B_y$ and $B_z$. In this case, all the three sensors may or may not be in the same plane.

Figure 5:
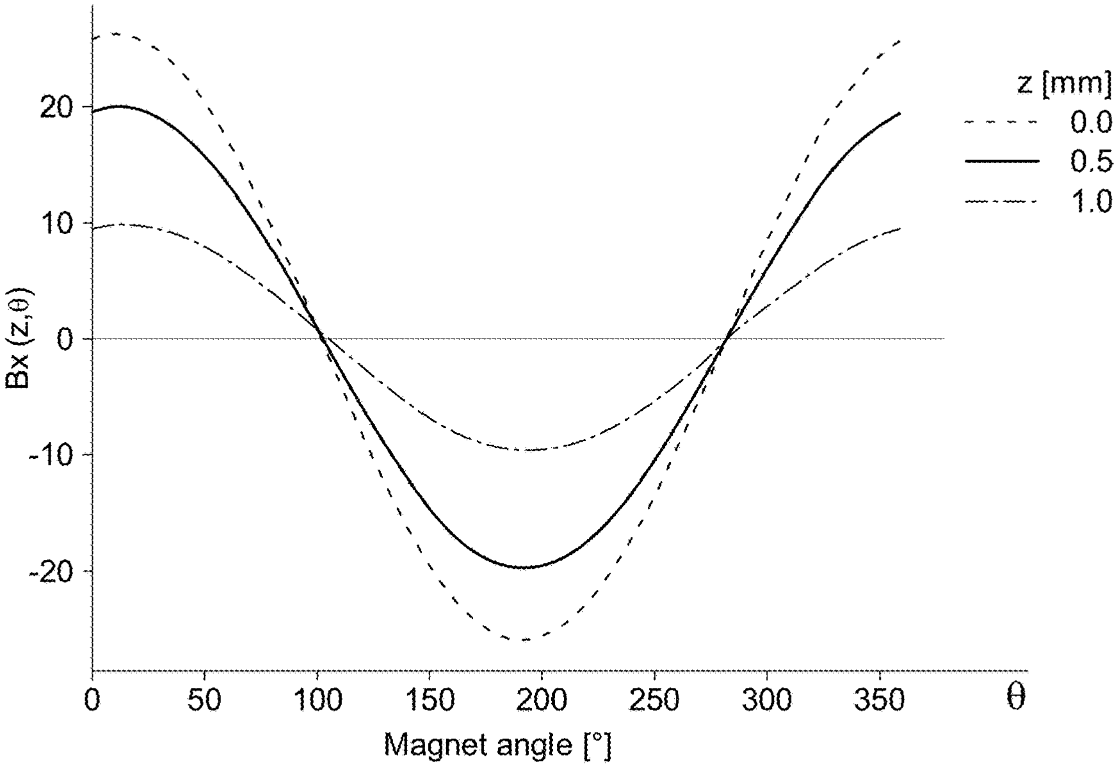
FIG. 5 shows values for component x of the magnetic field as a function of the angle of rotation of a setting stem and the axial displacement/position of this setting stem in the electronic control device of FIG. 4.
Figure 6:
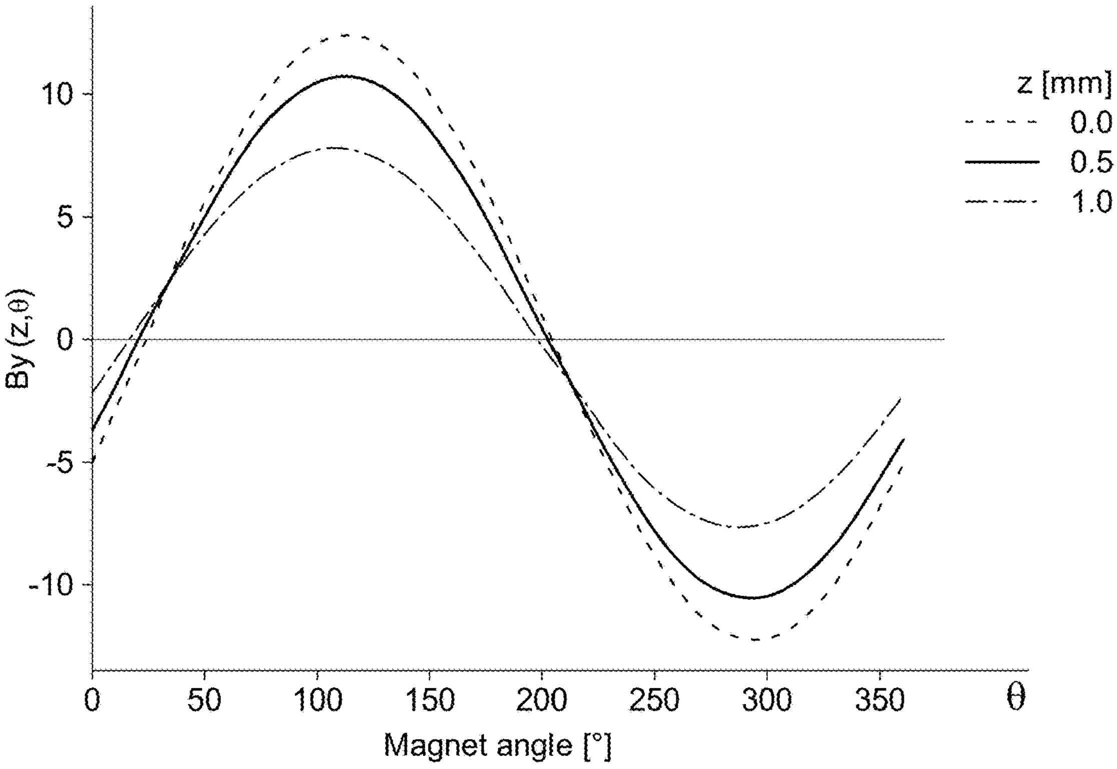
FIG. 6 shows values for component y of the magnetic field as a function of the angle of rotation of the setting stem and the axial displacement/position of this setting stem in the electronic control device of FIG. 4.
Figure 7:
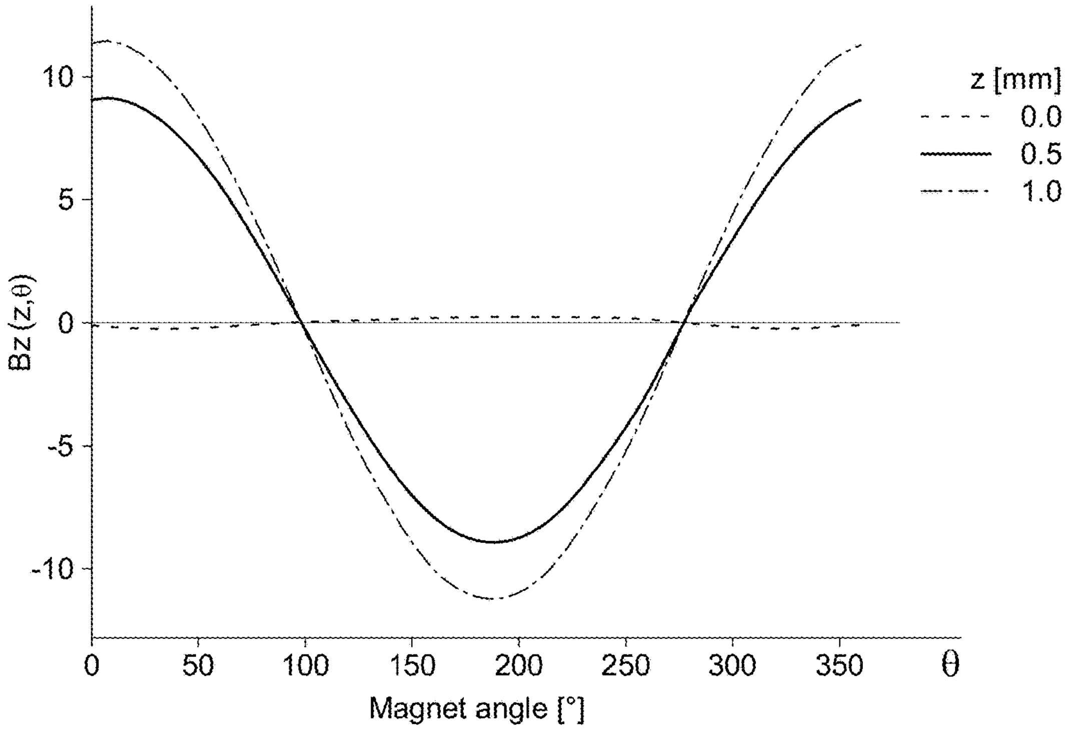
FIG. 7 shows values for component z of the magnetic field as a function of the angle of rotation of the setting stem and the axial displacement/position of this setting stem in the electronic control device of FIG. 4.

The method of determining the axial displacement or axial position of the magnet 7 and thus of the stem 3 along the rotation axis 5, according to the present invention, is based on the measurement of the components $B_x$, $B_y$ and $B_z$ of the magnetic induction field. These magnetic field components depend on the angle of rotation θ of the bipolar magnet but also on the position of this magnet along the rotation axis 5, which is parallel to the Z axis but distant from the rotation axis. It is to be noted that the symbol θ is used in the present description interchangeably for both the angle of rotation of the magnetic field (and thus of the magnet 7) and for the angle of rotation of the stem 3. The values of the magnetic field components $B_x$, $B_y$ and $B_z$ as a function of the angle of rotation θ of the magnet, each for three different axial displacements/positions, z=0.0 mm, z=0.5 mm and z=1.0 mm, are visible in FIGS. 5, FIG. 6, and FIG. 7. The magnetic field components are compensated for hard iron coefficients in order to remove effects due to parasitic magnetic fields and possibly due to temperature variations. In other words, the main operations of the compensation are the following: Eliminate offset due to the fabrication of the Hall sensors; remove distortions due to the presence of parasitic fields generated in particular by the circuit board that hosts the magnetometer; and possibly further eliminate the impact of the temperature. FIGS. 5, 6, and 7 show the values of the compensated magnetic field components.

Figure 8:
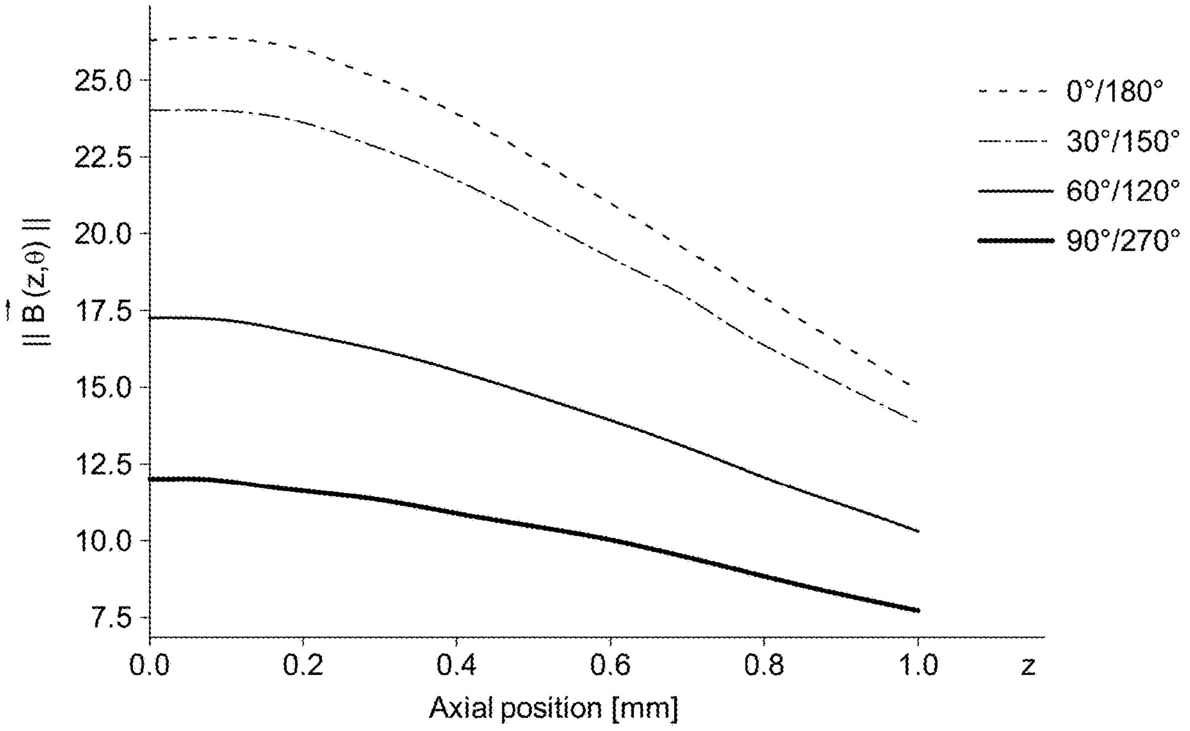
FIG. 8 shows values for the norm of the magnetic field as a function of the axial displacement/position and the angle of rotation of the setting stem in the electronic control device of FIG. 4.

Taken independently, these components are not sufficient to detect the axial displacement or axial position of the magnet. In addition, the component $B_z$ has two zero crossings per rotation of the magnet. However, if we take the norm of the magnetic field (in this example the Euclidean norm), i.e., $$\|\vec{B}(z,\theta)\| = \sqrt{B_x(z,\theta)^2 + B_y(z,\theta)^2 + B_z(z,\theta)^2},$$

we obtain an interesting behaviour, namely that its value decreases as the magnet 7 moves away from the magnetometer 9 along the rotation axis. Furthermore, the value of the norm is never zero. This is shown in FIG. 8. In practice, and for computational saving reasons, the square root is often not calculated, and the square of the norm is used. However, in this example, the norm is calculated and used.

It can be seen in FIG. 8 that the value of the norm depends not only on the axial displacement/position but also strongly on the rotation angle θ. To avoid or minimize this angle dependence, the method introduces a first function F(θ), which is also referred to as a compensation function and which only depends on the rotation angle/angular position θ. In other words, the value of the selected compensation function does not depend on the axial displacement/position. The compensation function is selected so that, when the norm of the magnetic field is multiplied by the compensation function, we obtain a second function G(z,θ), which depends predominantly on the axial position of the shaft (stem) and less or not on the rotation angle of the shaft:

$$G(z,\theta) = \|\vec{B}(z,\theta)\| \cdot F(\theta)$$

Figure 10:
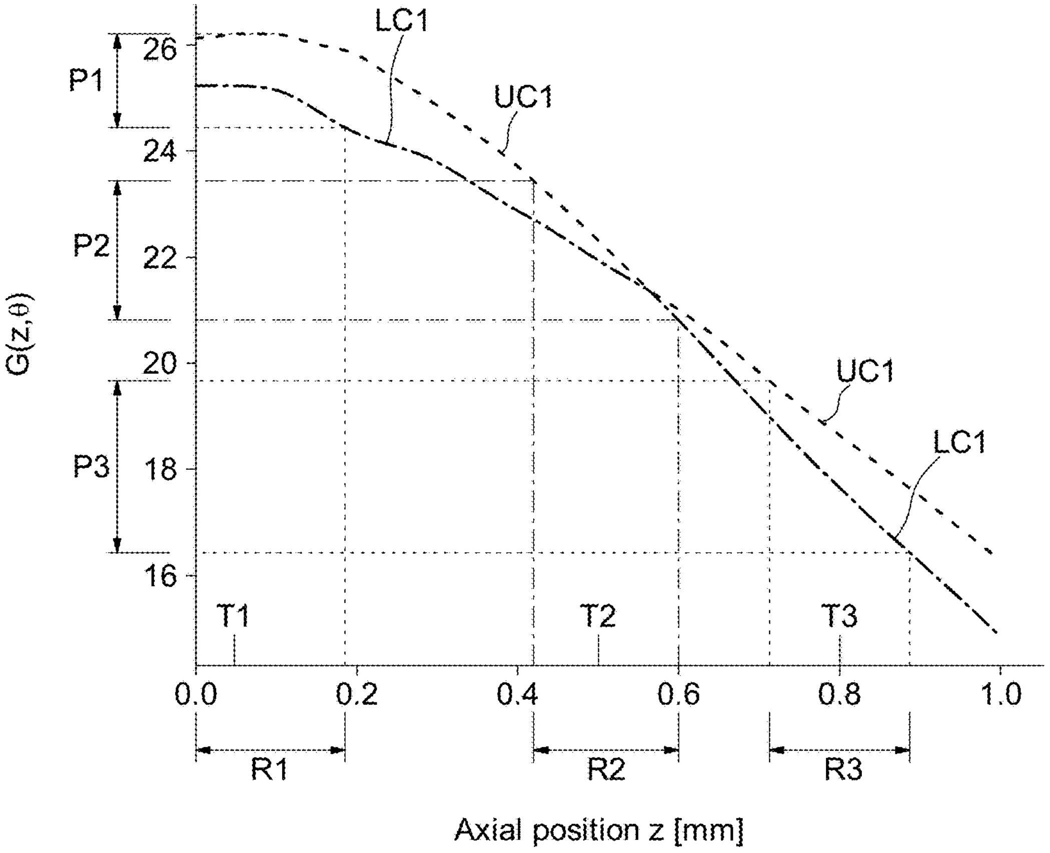
FIG. 10 shows values for functions $G(z,\theta)$, equal to the magnetic field norm multiplied by a single selected compensation function, used in a first mode of the present invention for selecting a relationship between possible values of these functions and corresponding axial displacements/positions of the setting stem for all possible angles of rotation of this setting stem in the electronic control device of FIG. 4.
Figure 11:
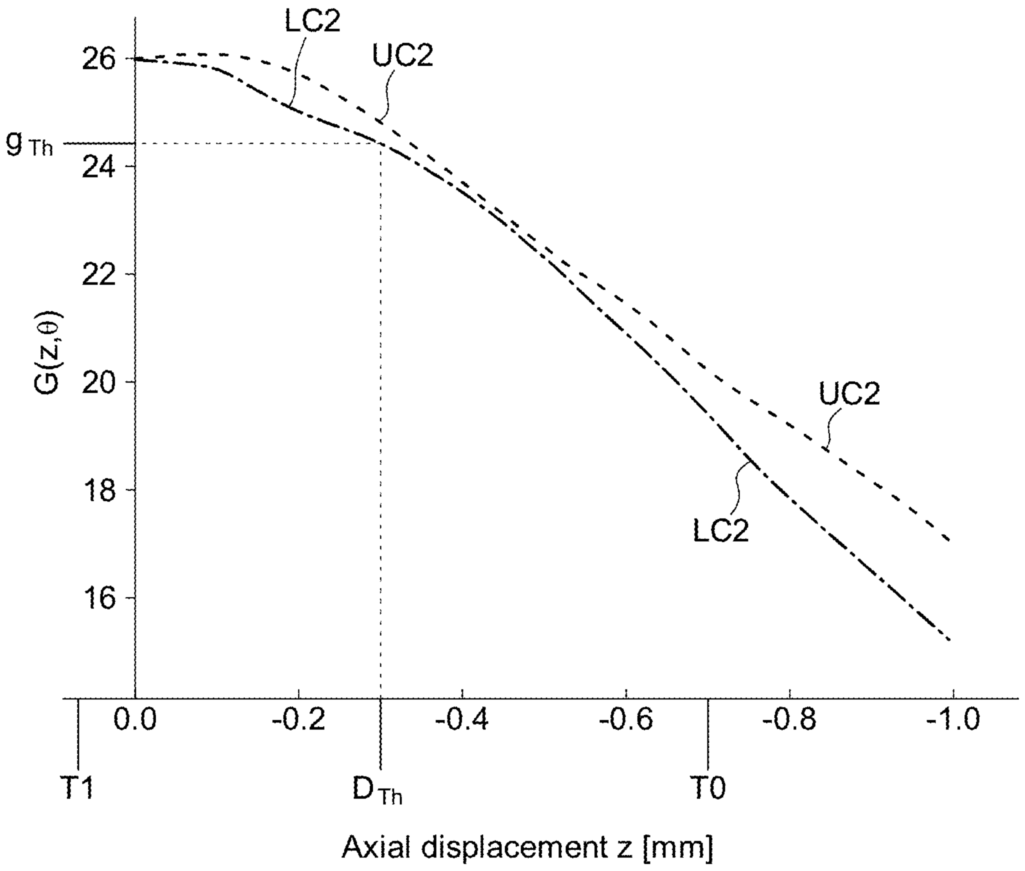
FIG. 11 shows values for functions $G(z,\theta)$, equal to the magnetic field norm multiplied by another single selected compensation function, used in a second mode of the present invention for selecting a relationship between possible values of these functions and corresponding axial displacements/positions of the setting stem for all possible angles of rotation of this setting stem in the electronic control device of FIG. 4.

This second function G(z,θ) is represented in FIGS. 10 and 11, along the rotation axis 5 (z being used as the variable along the rotation axis, which is parallel to the Z axis), respectively for two different specific compensation functions, where the inferior and superior curves, defined by the second function G(z,θ) for all angular positions θ, or in other words the envelope of all possible curves of G(z,θ), resulting from the dependency on the angular position θ for this second function, are shown. The two different specific compensation functions will still be described later in this description. On these figures, we can see that the dispersion of the second function G(z,θ) for all rotation angles/angular positions is much smaller than the corresponding dispersion for the norm.

The method further continues with the second function G(z,θ) because it allows to determine the axial displacement or position z of the magnet 7/stem 3 with a sufficient precision for several applications by selecting only one specific compensation function F(θ) (named 'compensation function') for each particular application. A main advantage of introducing the compensation function is that it allows to simplify the processing of measurement and to strongly minimise the necessary memory resources as there is no need to store a high number of different curves corresponding to different rotation angles/angular positions, as this would have be needed by using directly the norm for determining the axial displacement/position (see FIG. 8).

Figure 9:
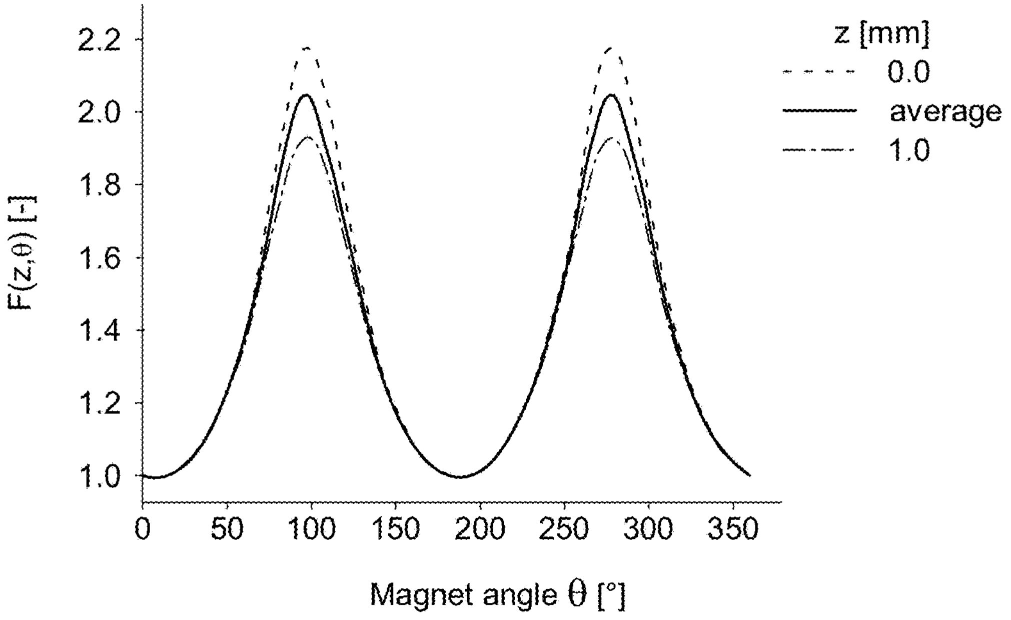
FIG. 9 shows compensation functions, each depending on the angle of rotation of the setting stem, compensating the dependence of the magnetic field norm on the angle of rotation for three different axial positions.

Preferred individual compensation functions $F_z$ (θ) are represented graphically in FIG. 9 for axial positions z from 0.0 mm (individual compensation function with the highest amplitude) to 1.0 mm (individual compensation function with the lowest amplitude), where we can see that these individual compensation functions somewhat depend on the axial position. Between the two extreme compensation functions (corresponding respectively to z=0.0 mm and z=1.0 mm) is represented a specific compensation function $F_m$ (θ) corresponding for each angular position to an average/middle of all individual compensation functions over the axial position z, for the given position range 0.0 mm to 1.0 mm. Thus, the function $F_m$ (θ) corresponds either to an average compensation function or to a middle compensation function.

The preferred individual compensation functions are all defined by a general compensation function $F_G$(z,θ) depending on the axial position z and the angular position θ:

$$F_G(z, \theta) = \left( \frac{\text{max over } \theta \text{ of } (\|\vec{B}(z, \theta)\|)}{\|\vec{B}(z, \theta)\|} \right)$$

However, the axial position is per definition not known before the method is performed, the method being indeed implemented for determining the axial displacement/position of the magnet/stem. Thus, the method of the present invention selects a single specific compensation function F(θ), advantageously based on the preferred general compensation functions $F_G$ (z,θ) represented in FIG. 9 (the two extreme compensation functions $F_z$ (θ) for z=0.0 mm and z=1.0 mm being represented, all other preferred individual compensation functions being located between these).

The single specific compensation function (named 'compensation function'), namely its amplitude, is specific to each electronic control device of the invention. According to a preferred implementation of the invention, the single specific compensation function F(θ) is selected in relation to the application for which the axial displacement/position determination method is implemented. For instance, if the method is used to detect distinct axial displacements/positions of the stem according to a first mode, such as stable positions T1, T2 and T3, then the average/middle compensation function $F_m$ (θ) may advantageously be selected. This compensation function is:

$$F_m(\theta) = \text{average or middle over } z \text{ of } \left( \frac{\text{max over } \theta \text{ of } (\|\vec{B}(z, \theta)\|)}{\|\vec{B}(z, \theta)\|} \right)$$

This means that, for the first mode, we take the average or middle value (shown with a solid line in FIG. 9) in order to minimise the deviation over the entire displacement/position range (z=0.0 to 1.0 mm) in the corresponding second function G (z,θ) due to the angular position, as can be seen in FIG. 10. In this FIG. 10, the curve UC1 is the upper limit and the curve LC1 is the lower limit for the second function G(z,θ) as a function of the axial position z by selecting for the compensation function F(θ) the average/middle compensation function $F_m$ (θ). Based on these upper and lower limit curves UC1 and LC1, the method establishes/selects a relationship, based on all angular positions θ, between values g of G(z,θ) and axial positions z. In general, the method selects a relationship between a first set of possible second values and a second set of possible axial displacements or axial positions or/and control values establishing for each second value of the first set a corresponding axial displacement or axial position of the shaft or a corresponding range of axial displacements or positions of the shaft or a corresponding control value.

In the example provided in FIG. 10, three position ranges R1, R2 and R3 are defined for the positive values of the axial positions z of the stem around three corresponding distinct stable axial positions T1, T2 and T3 that the stem can have. The position ranges R1, R2 and R3 are chosen to cover all possible positions, with sufficient margin and without overlapping, for the respective axial positions T1, T2 and T3 by taking into account manufacturing tolerances of the diverse elements forming the electronic control device and also tolerances resulting from the assembling of these elements. It is to be noted that to each range Rn, n=1, 2, 3 corresponds a range Pn, n=1, 2, 3 comprising all possible values g of the second function G (z,θ) for this range Rn. On the contrary, a range Rn, n=1, 2, 3 does not include all possible values z for the respective range Pn of G (z,θ). The selected relationship advantageously defines distinct non overlapping ranges Pn of g values for corresponding axial position range Rn of axial positions. In other words, the ranges of second values Pn are distinct such that no range of second values overlaps another one. This is represented in FIG. 10. Thus, there is only one position range Rn and a corresponding axial position Tn for any possible second value.

On the other hand, if the displacement/position determination method is used, according to a second mode, to detect an axial displacement of the stem 3, for example in the sense of position T0 from the position T1, in order to disable the determination of the rotation angle of the stem 3 or to disregard the determination of the rotation angle of the stem 3 when the stem is pressed by a user, then a different compensation function may be selected. This kind of operation is particularly useful if in a given position of the stem (which would typically be a non-pressed position of the stem) different menus are displayed by rotating the stem, while in a second position of the stem (which would typically be a pressed position of the stem) pressing of the stem would be used to select a given function or enter a menu, for example. In this example, the user upon pressing the stem could inadvertently simultaneously rotate the stem, which would then lead to a different menu unless the rotation detection is disabled or disregarded. In this scenario, the compensation function $F(\theta)$ could be defined as follows, where we take the value z=P to be more accurate at the beginning of the displacement from the axial position P, so as to be able to determine the pressing of the stem in its initial phase:

$$F_P(\theta) = \left( \frac{\text{max over } \theta \text{ of } \left(\|\vec{B}(z = P, \theta)\|\right)}{\|\vec{B}(z = P, \theta)\|} \right)$$

If the pressing function is intended from the axial position T1 (around z=0), then we introduce z=0 in the compensation function hereabove, as represented in FIG. 11. The curve UC2 is the upper limit and the curve LC2 is the lower limit for the second function $G(z,\theta)$ as a function of the axial position z by selecting for the compensation function $F(\theta)$ the compensation function $F_P(\theta)$ with P=0. We may choose a threshold value $g_{Th}$ for $G(z,\theta)$ below which the detection of the rotation of the stem must no longer be taken into consideration. This is illustrated in FIG. 11, where the negative position values along the rotation axis are shown. In other words, a threshold value $g_{Th}$ is defined for $G(z,\theta)$, and the method comprises disabling or disregarding a determination of the rotation angle of the shaft/stem 3, when the value g of $G(z,\theta)$ is less than or equal to the threshold value.

Thus, as explained, the compensation function may advantageously be made dependent on the use case or application of the displacement or position determination method.

Once the compensation function $F(\theta)$ has been selected, and once the current rotation angle $\theta$ of the stem has been measured, then the value of the second function $G(z,\theta)$ can be calculated. It is to be noted that the rotation angle may be measured or determined by following the teachings of EP3705902A1. As explained in EP3705902A1, the current rotation angle value of the stem in a plane orthogonal to the rotation axis of the shaft is determined based on two of the magnetic field components which are orthogonal to the rotation axis, i.e., components $B_x$, $B_y$. The value of $G(z,\theta)$ can then be calculated by multiplying the measured norm $N_c$ of the magnetic field by the value $g_c$ of the compensation function when the current rotation angle $\theta_c$ has been first applied to the compensation function $F(\theta)$.

The compensation function is selected so that the values g of $G(z,\theta)$ depend predominantly on the axial position z of the shaft and relatively less or not on the angle of rotation $\theta$ of the shaft. The upper and lower curves represent the uncertainty for any value g on the axial displacement/position.

In summary, if the proposed method is used to detect stable mechanical positions (first mode), such as positions T1, T2 and/or T3, then a set of non-overlapping ranges of values P1, P2 and P3 for the second function $G(z,\theta)$, corresponding to these stable positions of the stem including a possible error/mispositioning, may be defined as is further shown in FIG. 10. In the case of preventing rotation detection (second mode), we choose a threshold value $g_{Th}$ for $G(z,\theta)$ below which the value of the angle must no longer be taken into consideration. This is illustrated in FIG. 11.

Figure 12:
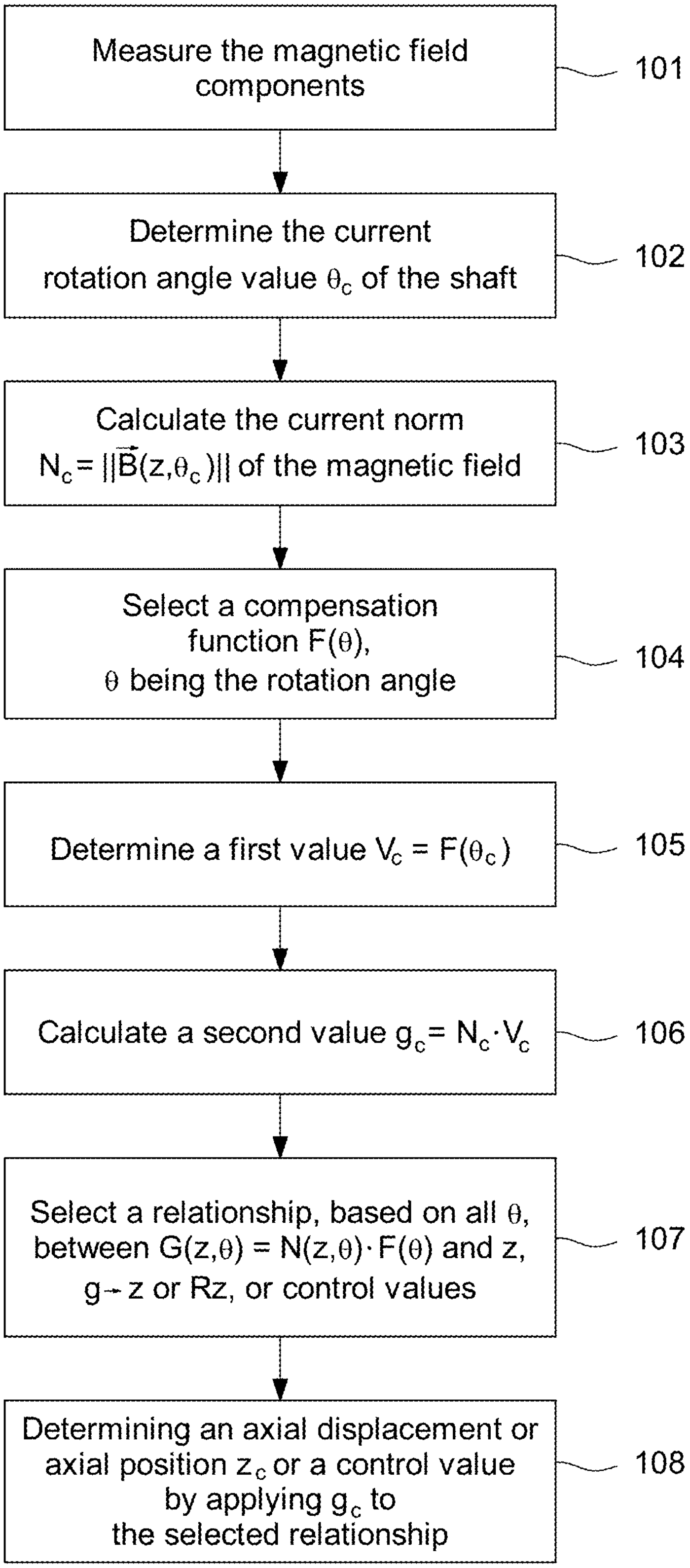
FIG. 12 is a flow chart summarising the steps of the proposed method.

The flow chart of FIG. 12 summarises the above method of determining the axial displacement or axial position of an at least partially magnetised stem of an electronic control device. In step 101, the first, second and third magnetic field components of a magnetic field, which are in this case orthogonal to each other, are measured by the magnetometer 9. This step normally comprises the step of compensating the magnetic field components to take into account the hard iron coefficients. In step 102, the current rotation angle value $\theta_c$ (current angular position) of the stem 3 in a plane orthogonal to the rotation axis 5 of this stem is determined based on at least two of the magnetic field components which are orthogonal to the rotation axis. In step 103, the current norm $N_c$ as squared or non-squared of the magnetic field is calculated based on the first, second and third magnetic field components: $N_c = \|\vec{B}(z,\theta)\|$. The norm depends on the axial displacement of the shaft along the rotation axis, and on the rotation angle of the shaft.

In step 104, a first function $F(\theta)$, referred to as compensation function, is selected for at least a mode/application, for example for the first and second modes described before, and in such a case the appropriate one is selected for the current mode (detection of the axial position among a set of possible stable axial positions or detection of the activation of the press button function). The selected compensation function depends on the rotation angle of the shaft but not on the axial displacement of the shaft. In step 105, a first value $V_c$, referred to as a compensation function value, is determined for the current rotation angle value $\theta_c$ by applying this current rotation angle value to the selected compensation function: $V_c = F(\theta_c)$. The obtained value $V_c$ is saved in a memory of the electronic crown module.

In step 106, a second value of the second function described before, is calculated by multiplying the calculated norm of the magnetic field and the determined compensation function value: $g_c = N_c - V_c$. According to the invention, the compensation function is selected so that the second function depends predominantly on the axial position of the shaft and relatively less or not on the rotation angle of the shaft. In particular, the compensation function is defined so that the bundle of second functions $G(z,\theta)$, for example as shown on FIGS. 10 and 11, is sufficiently narrow so that $G(z,\theta)$ can provide a relatively good approximation for the axial position z for all $\theta$ and therefore allowing a determination of a position z with a margin of error relatively low, so that it is in particular possible to unequivocally differentiate between given distinct positions (T1, T2, T3), or to determine whether the stem 3 has been pressed beyond a certain threshold value $D_{Th}$ allowing activation of a function, for example to prevent a untimely selection of a function in a menu via a rotation of the stem. In practice, the invention relies on the extreme curves, i.e. the upper and lower curves, for positions T1, T2 and T3 with their margin of error. For the detection of pressure, the invention relies generally on the lower curve, given that for a value of g less than a given threshold value $g_{Tn}$, it can be concluded that the stem is pressed by at least the corresponding displacement value $D_{Th}$ given by this lower curve.

In step 107, a relationship is selected between a first set of possible second values and a second set of possible axial displacements or axial positions or/and control values establishing for each second value of the first set a corresponding axial displacement or axial position of the shaft or a corresponding range of axial displacements or positions of the shaft or a corresponding control value. The control values relate to an adjustment of a function or operation of the timepiece. More specifically, the control values in this example can provide an intensity adjustment, depending on the axial displacement or axial position of the shaft, for a function of the timepiece. It is to be noted that the second function G(z) may not be directly used, but rather the invention may simply use the ranges defined by the lower and upper curves (the envelope), that is g→Rz, Rz being a range of possible axial positions for a given value g of the second function G(z). A relationship is thus selected between g and z, but not necessarily a function which by definition gives for each g a single value of z. Furthermore, for the mode linked to the detection of pressure on the stem with at least a certain displacement thereof, the algorithm does not determine an axial displacement z from the value of $g_c$ obtained, but instead it directly determines a command of a function based on the current value $g_c$. There is an implicit link with the axial position of the stem, but in this case the algorithm operates so that there is no specific step of determining an axial displacement z before an action.

In step 108, the axial displacement or axial position $z_c$ of the shaft, with respect to the sensor arrangement (9), or the control value is determined by applying the calculated second value $g_c$ to the selected relationship between the first set and the second set.

The data processing steps of the above-described method may be carried out by a digital signal processor (DSP), and which are thus computer-implemented processing steps. The DSP which may be part of the magnetometer, or it may be a stand-alone device. The DSP may also comprise the memory, or a stand-alone memory unit may be used for storing for instance the different functions and measurement values.

The solution proposed by the present invention thus makes it possible to detect the axial displacement or axial position of the stem without electrical contacts, and in an analogue manner. If the magnetometer 9 and the angle determination algorithm operate during the movement of the stem 3, the angle of the crown and then the axial position can be known precisely enough to unequivocally determine specific axial positions or axial position ranges determined using a single electronic component configured to carry out the necessary computations. It is then possible in particular to detect the adjustment positions T1, T2 and T3 (for the first mode) by eliminating the mechanical complexity of the electrical contacts. Regarding the second mode, it may happen that, when pressing the crown to reach T0 to thereby validate an operation or to enter a menu, a slight rotation of the crown generates an increment of angle sufficient to produce an involuntary change of menu in the watch. By monitoring the axial position of the crown according to the method of the invention, it is possible to prevent or disregard rotation detection once a given axial displacement or axial position value has been reached to avoid an involuntary menu change.

In view of the above, at least the following use cases are possible application scenarios of the present invention: detection of distinct positions of the stem (e.g., T1 to T3) according to the first mode, preventing or disregarding angular detection during axial movement of the stem in particular when selecting a function (menu) by pressing the crown (second mode 2), and intensity adjustment of an electronic watch function (third mode). The intensity adjustment function may involve moving slower or more rapidly the hands of the watch when setting the time, or it may be served for example as an interface for a game.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of determining an axial displacement or axial position, along a displacement axis, of a shaft, provided with a permanent magnetized part and rotating about the displacement axis, or a control value, for a given function or operation, depending on the axial displacement or axial position of the shaft by means of a magnetic sensor arrangement and a processing unit collectively forming an electronic control module, the method comprising the following steps carried out by the electronic control module:

measuring with the magnetic sensor arrangement first, second and third magnetic field components of a magnetic field, generated by the permanent magnetized part, respectively along orthogonal first, second and third axes linked to the magnetic sensor arrangement, the third axis being parallel to the displacement axis; and compensating these first, second and third magnetic field components for hard iron coefficients;

determining a current rotation angle value ($\theta_c$) of the shaft in a plane orthogonal to the displacement axis of the shaft based on the first and second compensated magnetic field components;

calculating a norm ($N_c$) of the magnetic field, as squared or non-squared, based on the first, second and third compensated magnetic field components, the norm depending on the axial position of the shaft, along the displacement axis, and on the rotation angle of the shaft;

selecting a compensation function F(θ), depending on the rotation angle (θ) of the shaft but not on the axial displacement or axial position (z) of the shaft;

determining a first value ($V_c$), referred to as a compensation function value, for the current rotation angle value ($\theta_c$) by applying the current rotation angle value to the compensation function;

calculating a second value ($g_c$) by multiplying the calculated norm ($N_c$) of the magnetic field and the determined compensation function value ($V_c$), the compensation function being selected so that the second value depends predominantly on the axial position of the shaft and less or not on the rotation angle of the shaft;

selecting a relationship between a first set of possible second values and a second set of axial displacements or axial positions or/and control values, depending on the axial displacements or axial positions, establishing for each second value of the first set a corresponding axial displacement or axial position of the shaft or a corresponding range of axial displacements or positions of the shaft or a corresponding control value; and determining the axial displacement or axial position of the shaft, with respect to the sensor arrangement, or the control value by applying the calculated second value ($g_c$) to the selected relationship between the first set and the second set.

2. The method according to claim 1, wherein the step of selecting a relationship between the first set and the second set establishes for each stable axial position of stable axial positions of the shaft a corresponding range of second values.

3. The method according to claim 2, wherein the ranges of second values are distinct such that no range of second values overlaps another one.

4. The method according to claim 1, wherein the step of selecting a relationship comprises defining a threshold value ($g_{Th}$) for the second value, and the step of determining the axial displacement or axial position or the control value comprises disabling or disregarding a determination of the rotation angle of the shaft when the second value is less than or equal to the threshold value.

5. The method according to claim 1, wherein said control values in the step of selecting a relationship provides an intensity adjustment, depending on the axial displacement or axial position of the shaft, for a function of a timepiece incorporating an electronic control device comprising the shaft and the electronic control module.

6. The method according to claim 1, wherein the compensation function is selected based on how the axial displacement or position of the shaft is used.

7. The method according to claim 3, wherein the compensation function F(θ) is as follows:

$$F(\theta) = \text{mean over } z \text{ of } \left( \frac{\text{max over } \theta \text{ of } (\|\vec{B}(z, \theta)\|)}{\|\vec{B}(z, \theta)\|} \right),$$

wherein z denotes the axial displacement or axial position along the rotation axis of the shaft, θ denotes the rotation angle of the shaft (3) in a plane orthogonal to the rotation axis, and $\vec{B}(z,\theta)$ denotes the magnetic field.

8. The method according to claim 4, wherein the compensation function F(θ) is as follows:

$$F(\theta) = \left( \frac{\text{max over } \theta \text{ of } (\|\vec{B}(z = P, \theta)\|)}{\|\vec{B}(z = P, \theta)\|} \right),$$

wherein θ denotes the rotation angle of the shaft in a plane orthogonal to the rotation axis, z=P denotes a given axial displacement or axial position along the rotation axis of the shaft from which an axial displacement is to be detected, and $\vec{B}(z,\theta)$ denotes the magnetic field.

9. The method according to claim 8, wherein the axial position P=0.

10. The method according to claim 1, wherein the sensor arrangement is a three-axis magnetometer, or is formed by three sensors, each configured to determine different one of the magnetic field components.

11. The method according to claim 1, wherein the electronic control module is incorporated in a timepiece, wherein the shaft is a setting stem associated with a crown of the timepiece, and wherein the permanent magnetized part of the shaft is a bipolar magnet fixed to the shaft and having a diametral magnetisation.

12. An electronic control device for determining an axial displacement or axial position, along a displacement axis, of a shaft or a control value, for a given function or operation, depending on the axial displacement or axial position of the shaft, the shaft being provided with a permanent magnetised part and configured to rotate about a displacement axis, the electronic control device including a control module comprising a magnetic sensor arrangement and a processing unit, the electronic control module comprising means for:

measuring with the magnetic sensor arrangement first, second and third magnetic field components of a magnetic field, generated by the permanent magnetized part, respectively along orthogonal first, second and third axes linked to the magnetic sensor arrangement, the third axis being parallel to the displacement axis; and compensating these first, second and third magnetic field components for hard iron coefficients;

determining a current rotation angle value ($\theta_c$) of the shaft in a plane orthogonal to the displacement axis of the shaft based on the first and second compensated magnetic field components;

calculating a norm ($N_c$) of the magnetic field, as squared or non-squared, based on the first, second and third compensated magnetic field components, the norm depending on the axial position of the shaft along the displacement axis, and on the rotation angle of the shaft;

selecting a compensation function F(θ), depending on the rotation angle (θ) of the shaft but not on the axial displacement or axial position (z) of the shaft;

determining a first value ($V_c$), referred to as a compensation function value, for the current rotation angle value ($\theta_c$) by applying the current rotation angle value to the compensation function;

calculating a second value ($g_c$) by multiplying the calculated norm of the magnetic field and the determined compensation function value, the compensation function being selected so that the second value depends predominantly on the axial position of the shaft and less or not on the rotation angle of the shaft;

selecting a relationship between a first set of possible second values and a second set of axial displacements or axial positions or/and control values, depending on the axial displacements or axial positions, establishing for each second value of the first set a corresponding axial displacement or axial position of the shaft or a corresponding range of axial displacements or positions of the shaft or a corresponding control value; and determining the axial displacement or axial position of the shaft, with respect to the sensor arrangement, or the control value by applying the calculated second value to the selected relationship between the first set and the second set.

13. A timepiece comprising the electronic control device according to claim 12.

* * * * *